United States Patent
Kumar

(10) Patent No.: US 12,339,508 B2
(45) Date of Patent: Jun. 24, 2025

(54) DUAL-LAYER SHEATH FOR AN OPTICAL FIBER CABLE

(71) Applicant: Sterlite Technologies Limited, Gurgaon (IN)

(72) Inventor: Sravan Kumar, Gurgaon (IN)

(*) Notice: Subject to any disclaimer, the term of this patent is extended or adjusted under 35 U.S.C. 154(b) by 0 days.

(21) Appl. No.: 17/719,374

(22) Filed: Apr. 13, 2022

(65) Prior Publication Data

US 2024/0329347 A1    Oct. 3, 2024

(51) Int. Cl.
    *G02B 6/44*    (2006.01)

(52) U.S. Cl.
    CPC ................. *G02B 6/4432* (2013.01)

(58) Field of Classification Search
    CPC .... G02B 6/4432; G02B 6/4429; G02B 6/443; G02B 6/4434
    See application file for complete search history.

(56) References Cited

U.S. PATENT DOCUMENTS

| | | | | |
|---|---|---|---|---|
| 4,078,853 A | * | 3/1978 | Kempf | G02B 6/4411 385/114 |
| 10,107,980 B1 | * | 10/2018 | Debban | G02B 6/4404 |

* cited by examiner

*Primary Examiner* — John Bedtelyon
(74) *Attorney, Agent, or Firm* — Steven R. Fairchild; Michael J. Pennington

(57) ABSTRACT

The present invention relates to a flexible high density optical fiber cable (100) having no central strength member. Particularly, the optical fiber cable (100) comprises a core having a plurality of bundled optical fiber ribbons (104), a inner layer (108), a outer layer (112) and a continuous strength layer (110) sandwiched between the inner layer (108) and the outer layer (112). The continuous strength layer (110) is a stiff strength member providing flexibility and strength to the optical fiber cable (100). The proposed structure of the optical fiber cable (100) enables the optical fiber cable (100) to have an optimized blowing performance and anti-buckling characteristics.

18 Claims, 2 Drawing Sheets

DUAL-LAYER SHEATH FOR AN OPTICAL FIBER CABLE

FIELD OF THE INVENTION

Embodiments of the present invention relate to the field of optical fiber cables, and more specifically, relate to a high density optical fiber cable without a central strength member.

DESCRIPTION OF THE RELATED ART

An optical fiber cable is a core and fundamental part of the current high speed network infrastructure. Particularly, the optical fiber cable comprises several concentrically placed/layered components. Moreover, the optical fiber cable has a core comprising a data transmission component i.e., optical fibers are present in groups encapsulated in a protective layer called loose tubes. The loose tubes are made of polymeric materials or any suitable material as per the desired applications. To provide extra protection, the optical fiber can be tightly buffered within a suitable polymeric layer. Such optical fibers are called tight buffered optical fibers. The loose tube concentrically encapsulates the tight buffered optical fibers. The loose tube further is encapsulated by aramid yarns to provide cushioning and to increase strength. Further, a hard material jacketing is done over the aramid yarns. Furthermore, a strength member may be deployed at a centre of the optical fiber cable, to enable the optical fiber cable not to have bends that affect the optical properties of the optical fibers. In some designs, the strength members are also deployed inside the jackets rather than at the centre of the optical fiber cable.

In case of higher fiber count cables, as the number of optical fibers increases, the cable size also increases. Due to the increase in the optical fiber cable size and rigid central strength member, the optical fiber cable becomes resistant to the bends. The non-bending of optical fiber cable due to the central strength member, poses a challenge while installing optical fiber cables at sharp grooves. The cable blowing becomes a challenge for high fiber count optical fiber cables, as they have large diameters and duct size is also limited.

German patent DE102008015605A1 focusses on a double layered sheathing and an intermediate layer in-between comprising aramid yarns (additionally glass fibers) for a single fiber tight-buffered is disclosed, where a transition region is formed between an outer sheath and an intermediate layer. The transition region adds complexity in design and handling of the optical fiber cable.

To overcome the problem of increase in diameter due to the increase in density of the optical fibers, recently an intermittently bonded optical fiber ribbon configuration has been developed. Typically, the optical fibers are placed in parallel and bonded with special material intermittently along the longitudinal length and width, to convert groups of optical fibers into intermittently bonded ribbons. These intermittently bonded ribbons are different from the conventional optical fiber ribbons that are bonded continuously along the length of the optical fiber. The advantage of the intermittently bonded optical fiber ribbons is that they can be rolled up on their central axis, leading to efficient packaging of optical fibers and enable increase in density of the optical fibers into the optical fiber cable. However, the deployment of the strength members at the centre still pose a challenge, as the optical fiber cable becomes bend resistive at sharp ends that may lead to issues in cable installation i.e. cable blowing and handling. Also, the conventional optical fiber ribbons are bonded continuously along the length and width of the optical fiber, making them rigid and non-flexible.

Further, the conventional optical fiber cables have a central strength member deployed at a core that restricts bending, the present disclosure provides a flexible high density optical fiber cable having no central strength member.

Accordingly, to overcome the disadvantages of the prior art. Thus, the present invention focuses on providing a flexible high density optical fiber cable without a central strength member.

SUMMARY OF THE INVENTION

An embodiment of the present invention relates to an optical fiber cable with high density of optical fibers. The optical fiber cable uses a plurality of bundled intermittently bonded optical fiber ribbons. Alternatively, the optical fiber cable may use bendable or rollable optical fiber ribbons.

In accordance with an embodiment of the present invention, the two layer cable sheath design with stiff strength layer yarns in-between the two layers. The strength layer yarns impart strength to the optical fiber cable. In an example, the strength layer yarns may be glass roving yarns. In another example, the strength layer yarns may be made from any other suitable material. Advantageously, the optical fiber cable using a non-CSM (central strength member) design provides flexibility for easy handling and easy installation. Further, the optical fiber cable uses stiff yarns or stiff strength members that provide optimized blowing.

In accordance with an embodiment of the present invention, the optical fiber cable comprises an outer layer, a continuous strength layer, an inner layer, and a plurality of bundled optical fiber ribbons. In particular, the outer layer concentrically encapsulates the continuous strength layer. Particularly, the inner layer concentrically encapsulates a plurality of bundled optical fiber ribbons. Moreover, the continuous strength layer is sandwiched between the outer layer and the inner layer.

In accordance with an embodiment of the present invention, the inner layer is made from a material with a melt flow index (MFI) between 0.3 to 2 g/10 min. In particular, the inner layer is a polypropylene layer.

In accordance with an embodiment of the present invention, the continuous strength layer is made of a glass yarns or a glass roving yarns. In particular, the continuous strength layer is helically wrapped around the inner layer. Moreover, the continuous strength layer has a thickness of 0.3 mm.

In accordance with an embodiment of the present invention, the outer layer is made from a material with a melt flow index (MFI) 0.3 g/10 min or above. In particular, the outer layer is a high density poly-ethylene (HDPE) layer.

In accordance with an embodiment of the present invention, the inner layer and outer layer has a thickness of 0.6 mm to 1.5 mm.

In accordance with an embodiment of the present invention, the optical fiber cable has a crush resistance of more than 2000N/100 mm. In particular, the optical fiber cable is a flexible high density optical fiber cable.

In accordance with an embodiment of the present invention, the optical fiber cable comprises the plurality of bundled optical fiber ribbons in a core. Moreover, the optical fiber cable has a diameter of 9.2 mm for 288 optical fiber count. Furthermore, the optical fiber cable has a diameter of 26.2 mm for 1728 optical fiber count. Further, the optical fiber cable has a diameter of 36.6 mm for 6912 optical fiber count.

Particularly, the plurality of bundled optical fiber ribbons is a plurality of bundled intermittently bonded optical fiber ribbons. In particular, the plurality of bundled optical fiber ribbons is any of a bendable optical fiber ribbons or rollable optical fiber ribbons. Moreover, the plurality of optical fiber ribbons is bundled with a binder to form the plurality of bundled optical fiber ribbons. Furthermore, each bundled optical fiber ribbons of the plurality of bundled optical fiber ribbons have optical fiber ribbons in a range of 6 to 24.

In accordance with an embodiment of the present invention, the high fiber count accommodates 288 optical fibers, 1728 optical fibers or 6912 optical fibers.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

The foregoing objectives of the present invention are attained by employing an optical fiber cable with a dual-layer sheath.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Optical fiber cable—100
Plurality of optical fibers—102
Bundled optical fiber ribbons 104
Binder—106
Inner layer—108
Continuous strength layer—110
Outer layer—112

The optical fiber cable illustrated in the accompanying drawings, which like reference letters indicate corresponding parts in the various figures. It should be noted that the accompanying FIGURE is intended to present illustrations of exemplary embodiments of the present disclosure. This FIGURE is not intended to limit the scope of the present disclosure. It should also be noted that the accompanying FIGURE is not necessarily drawn to scale.

DETAILED DESCRIPTION OF THE INVENTION

Figure 1A:
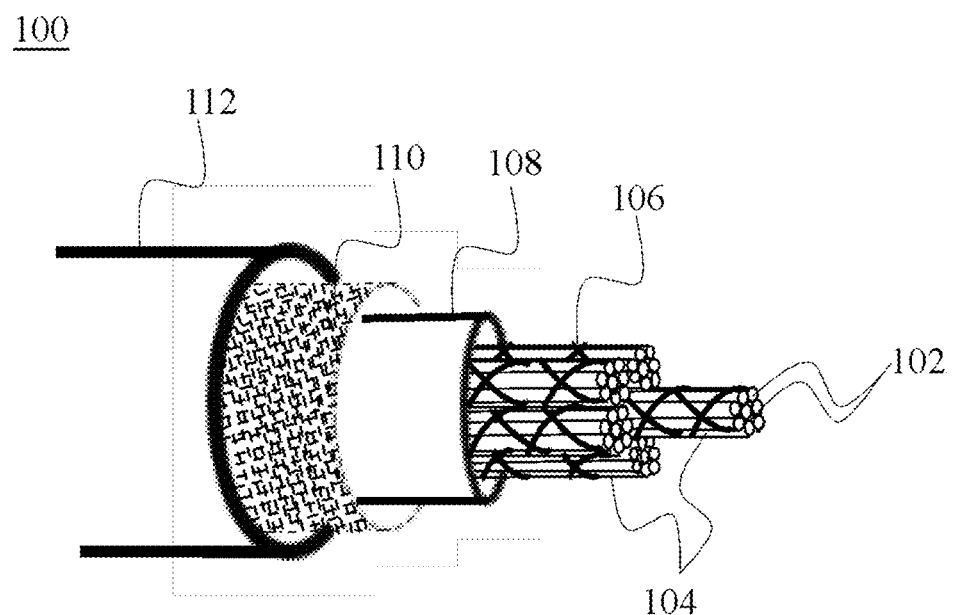
FIG. 1A illustrates a side-view of an optical fiber cable having no central strength member.
Figure 1B:
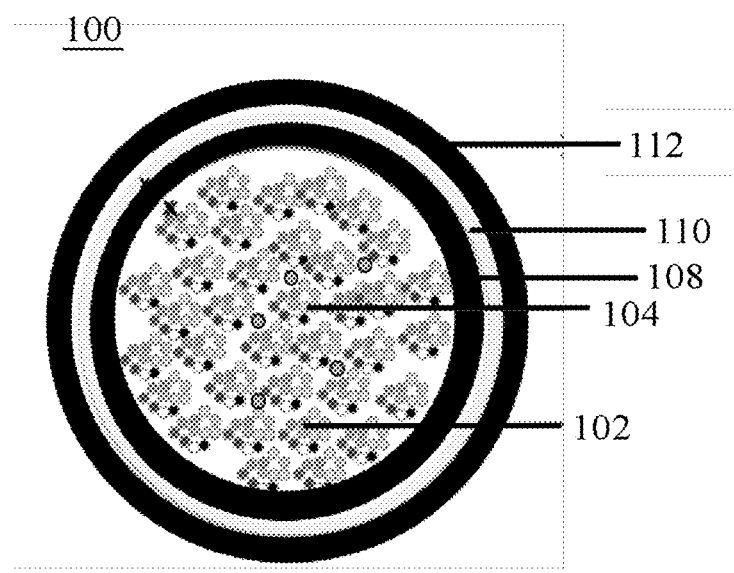
FIG. 1B illustrates a cross-sectional view of the optical fiber cable having no central strength member.

The principles of the present invention and their advantages are best understood by referring to FIG. 1A to FIG. 1B. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber refers to a medium associated with signal transmission over long distances in the form of light pulses. The optical fiber uses light to transmit voice and data communications over long distances when encapsulated in a jacket.

The melt flow index (MFI) or a melt flow rate (MFR) is a parameter that measures ease of flow of a melt of a thermoplastic polymer. It is defined as mass of polymer, in grams, flowing in ten minutes through a capillary of a specific diameter and length by a pressure applied via prescribed alternative gravimetric weights for alternative prescribed temperatures.

The crush resistance testing determines the ability of the optical fiber cable (100) to withstand and/or recover from the effects of a compressive force.

The longitudinal axis is an imaginary axis along the lengthwise direction of the optical fiber cable.

Optical fiber blowing is a process of installing the optical fiber cable into a pre-installed duct or directly buried duct safely.

Buckling of the optical fiber cable is the deformation of the optical fiber cable due to the external forces that acted on the cable during installation phase and in laid position.

Terms "first layer" and "inner layer" are used interchangeably for convenience.

Terms "second layer", "continuous strength layer" and "stiff strength member" are used interchangeably for convenience.

Terms "third layer" and "outer layer" are used interchangeably for convenience.

FIGS. 1A and 1B illustrate a side-view and a cross-sectional view of an optical fiber cable (100) having no central strength member in accordance with one or more embodiments of the present invention. In particular, the optical fiber cable (100) has a dual layer sheath design. And, the optical fiber cable (100) has a core comprising a plurality of bundled optical fiber ribbons (104).

In an exemplary example, the plurality of bundled optical fiber ribbons may be a plurality of bundled intermittently bonded optical fiber ribbons. In particular, the plurality of bundled intermittently bonded optical fiber ribbons comprises a plurality of optical fibers (102) intermittently bonded with each other. Moreover, the plurality of optical fibers (102) are but not limited to, a glass optical fiber, a plastic optical fiber. Further, the plurality of optical fibers (102) may be of different diameters i.e. 250 micrometres, 200 micrometres or the like.

In accordance with an embodiment of the present invention, the plurality of optical fibers (102) is placed parallel with respect to each other and bonded with a special material, intermittently along a length and width of the plurality of optical fibers (102), to convert the plurality of optical fibers into flexible intermittently bonded optical fiber ribbons. Moreover, the intermittent bond among the plurality of optical fibers (102) converts the plurality of optical fibers (102) into a flexible intermittently bonded optical fiber ribbon. Furthermore, the intermittently bonded optical fiber ribbons enable the optical fiber cable (100) to accommodate a high number of optical fibers.

In an alternate embodiment of the present invention, the plurality of bundled optical fiber ribbons (104) may include bendable or rollable optical fiber ribbons. The bendable or rollable optical fiber ribbons may be bent or rolled from a flat shape without deteriorating the optical properties of the optical fibers.

In an embodiment of the present intention, the optical fiber cable (100) may accommodate 288 optical fibers. Alternatively, the optical fiber cable (100) may accommodate 1728 optical fibers. Alternatively, the optical fiber cable (100) may accommodate 6912 optical fibers. Alternatively, the number of optical fibers in the optical fiber cable (100) may vary.

In accordance with an embodiment of the present invention, the plurality of optical fiber ribbons is further bundled with a binder (106) and forms the plurality of bundled optical fiber ribbons (104). In particular, each bundled optical fiber ribbons from the plurality of bundled optical fiber ribbons may have the optical fiber ribbons in a range of 6 to 24. Alternatively, the number of the optical fiber ribbons in the plurality of bundled optical fiber ribbons may vary. Moreover, the plurality of bundled optical fiber ribbons (104) forms the core of the optical fiber cable (100).

A theoretical diameter of the core comprising all the optical fiber ribbon bundles may be 6.22 mm for 288 optical fiber count. Alternatively, theoretical diameter of the core comprising all the optical fiber ribbon bundles may be 20.8 mm for 1728 optical fiber count. Alternatively, theoretical diameter of the core comprising all the optical fiber ribbon bundles may be 30 mm for 6912 optical fiber count. Alternatively, theoretical diameter may vary depending upon the number of optical fibers. The plurality of bundled optical fiber ribbons (104) are placed along a length of the optical fiber cable (100).

In accordance with an embodiment of the present invention, the optical fiber cable (100) comprises a first layer (108) concentrically encapsulating the plurality of bundled optical fiber ribbons (104). Particularly, the first layer (108) is an inner jacket or an inner sheath or an inner layer that covers the core of the optical fiber cable (100). Moreover, the first layer (108) serves as an inner sheath of the optical fiber cable (100) as it is not feasible to provide a strength layer directly on the optical fiber cable core as it may damage the plurality of optical fibers (102). Therefore, a thermoplastic based first layer (108) encloses and protects the core of the optical fiber cable from any damage from the strength layer.

In an exemplary example, the first layer (108) may be made from a low melt flow index (MFI) material such as polymer, thermoplastics or the like.

In another example, the first layer (108) may be made of polypropylene that has a low melt flow index (MFI). The first layer (108) may be made of any other suitable materials that have a low melt flow index (MFI). Particularly, the melt flow index may preferably be between 0.3 g/10 min to 2 g/10 min as below 0.3 g/10 min materials of the first layer (108) may become viscous which requires a high pressure to pump it in a sheath extrusion equipment thereby limiting optimal line speeds. Moreover, the material with low MFI is easy to handle and a good structural stability may easily be maintained. As the first layer (108) does not have any support beneath, making it with a high MFI (more than 2) makes it difficult to achieve good structural stability in the first layer (108).

In accordance with an embodiment of the present invention, the first layer (108) may have a thickness of 0.6 mm. Alternatively, the first layer (108) may have the thickness of 1.2 mm. Alternatively, the first layer (108) may have the thickness of 1.5 mm. Alternatively, the thickness of the first layer (108) may vary depending upon the number of optical fibers in the cable.

In accordance with an embodiment of the present invention, the optical fiber cable (100) further comprises a second layer (110) concentrically encapsulating the first layer (108). In particular, the second layer (110) may be helically wrapped around the first layer (108). The second layer (110) is a continuous strength layer (or a stiff strength member). It is not feasible to provide the continuous strength layer (or stiff strength member) directly on the core of the optical fiber cable (100) as it may damage the fibers/ribbons. Therefore, the continuous strength layer is wrapped around the first layer (108).

In accordance with an embodiment of the present invention, the stiff strength member may be glass yarns or glass roving yarns. In particular, the glass roving yarns are glass strands or filaments made from several types of glasses such as, but not limited to, electric grade glass, S-glass, C-glass.

Moreover, the stiff strength member may be made of any other suitable material. The stiff strength member provides strength and flexibility to the optical fiber cable (100). Further, the optical fiber cable (100) with no CSM or no embedded strength members needs to have sufficient mechanical strength and stiffness in the optical fiber cable (100). Subsequently, the second layer (110) provides necessary stiffness for blowing performance and mechanical strength for crush resistance without making the optical fiber cable too heavy or increasing the diameter too much.

In accordance with an embodiment of the present invention, the stiff strength member has a thickness of 0.3 mm. Alternatively, the stiff strength member may have a thickness more than 0.3 mm. Alternatively, the stiff strength member may have a thickness less than 0.3 mm. Alternatively, the thickness of the second layer (110) may vary depending upon the number of fibers.

In accordance with an embodiment of the present invention, the optical fiber cable (100) further comprises a third layer (112) concentrically encapsulating the second layer (110). In particular, the third layer (112) is an outer layer or an outer jacket or an outer sheath of the optical fiber cable (100). The optical fiber cable may not have a strength layer as its outermost layer, therefore, the third layer (112) is applied to protect the optical fiber cable from any external stresses and impacts and allow easy handling of the optical fiber cable. Moreover, the third layer (112) may preferably be made of a high density polyethylene (HDPE) material. Furthermore, the third layer (112) may be made of any other suitable material such as polymer, low-smoke zero-halogen or the like. Subsequently, the third layer (112) may be made from a material with a melt flow index (MFI) of 0.3 g/10 min or above as below 0.3 g/10 min materials of the third layer (108) may become viscous which requires a high pressure to pump it in a sheath extrusion equipment thereby limiting optimal manufacturing line speeds. While extruding the outer layer, it may get support from the beneath strength layer, therefore it is feasible to use material with a high MFI and still maintain good structural integrity of the outer layer.

In accordance with an embodiment of the present invention, the third layer (112) may have a thickness of 0.6 mm. Alternatively, the third layer (112) may have the thickness of 1.5 mm. Alternatively, the thickness of the third layer (112) may vary depending upon the number of optical fibers in the optical fiber cable.

The optical fiber cable (100), includes the core, the first layer (108), the third layer (112) and the second layer (110) sandwiched between the first layer (108) and the third layer (112), has a diameter of approximately 9.2 mm for 288 optical fiber count. Alternatively, the optical fiber cable (100) may have a diameter of approximately 26.2 mm for 1728 optical fiber count. Alternatively, the optical fiber cable (100) may have a diameter of approximately 36.6 mm for 6912 optical fiber count. Alternatively, the diameter of the optical fiber cable (100) may vary. The optical fiber cable (100) may have any suitable dimensions depending upon the optical fiber count.

In accordance with an embodiment of the present invention, the optical fiber cable (100) may have a crush resistance more than 2000N/100 mm. In particular, the strength layer in the optical fiber cable (100) provides sufficient mechanical strength and helps to achieve the crush resistance of the cable more than 2000N/100 mm. This is a standard requirement of crush resistance for outdoor cables. Alternatively, the crush resistance of the optical fiber cable (100) may vary.

The optical fiber cable (100) may be defined along a longitudinal axis passing through a geometrical center (not shown) of the optical fiber cable (100). In general, the geometrical center is a central point of the optical fiber cable (100).

Advantageously, the present invention of the optical fiber cable with the dual layer sheath with the strength layer in-between is flexible and compact due to absence of the central strength member. Moreover, the dual layer sheath with the strength layer in-between enables the optical fiber cable to have an optimized blowing performance and anti-buckling characteristics. The helical arrangement of the continuous strength layer provides an extra length to the continuous strength layer. Also, for turning and bending of the optical fiber cable, the extra length helps to reduce stress on the continuous strength layer. Further, optical fiber cable is easy to manufacture and handle, with optimized cable blowing performance and anti-buckling characteristics.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

What is claimed for:

1. A optical fiber cable having a high fiber count, wherein the optical fiber cable comprising:
    an outer layer concentrically encapsulating a continuous strength layer;
    an inner layer concentrically encapsulating a plurality of bundled optical fiber ribbons; and the continuous strength layer sandwiched between the outer layer and the inner layer wherein the continuous strength layer is made of a glass yarns or a glass roving yarns;

wherein the optical fiber cable is a flexible high density optical fiber cable.

2. The optical fiber cable as claimed in claim 1, wherein the inner layer is made from a material with a melt flow index (MFI) between 0.3 to 2 g/1 0 min.

3. The optical fiber cable as claimed in claim 2, wherein the inner layer is a polypropylene layer.

4. The optical fiber cable as claimed in claim 1, wherein the continuous strength layer is helically wrapped around the inner layer.

5. The optical fiber cable as claimed in claim 1, wherein the outer layer is made from a material with a melt flow index (MFI) 0.3 g/1 0 min or above.

6. The optical fiber cable as claimed in claim 1, wherein the optical fiber cable has a crush resistance of more than 2000N/100 mm.

7. The optical fiber cable as claimed in claim 5, wherein the outer layer is a high density poly-ethylene (HOPE) layer.

8. The optical fiber cable as claimed in claim 1, wherein the optical fiber cable comprises a core with the plurality of bundled optical fiber ribbons.

9. The optical fiber cable as claimed in claim 1, wherein the plurality of bundled optical fiber ribbons is a plurality of bundled intermittently bonded optical fiber ribbons.

10. The optical fiber cable as claimed in claim 9, wherein the plurality of bundled optical fiber ribbons is any of a bendable optical fiber ribbons or a rollable optical fiber ribbons.

11. The optical fiber cable as claimed in claim 10, wherein each bundled optical fiber ribbons of the plurality of bundled optical fiber ribbons have optical fiber ribbons in a range of 6 to 24.

12. The optical fiber cable as claimed in claim 1, wherein the high fiber count accommodates 288 optical fibers, 1728 optical fibers or 6912 optical fibers.

13. The optical fiber cable as claimed in claim 12, wherein the optical fiber cable has a diameter of 9.2 mm for 288 optical fiber count.

14. The optical fiber cable as claimed in claim 12, wherein the optical fiber cable has a diameter of 26.2 mm for 1728 optical fiber count.

15. The optical fiber cable as claimed in claim 12, wherein the optical fiber cable has a diameter of 36.6 mm for 6912 optical fiber count.

16. The optical fiber cable as claimed in claim 1, wherein the plurality of optical fiber ribbons is bundled with a binder to form the plurality of bundled optical fiber ribbons.

17. The optical fiber cable as claimed in claim 1, wherein the inner layer and outer layer has a thickness of 0.6 mm to 1.5 mm.

18. The optical fiber cable as claimed in claim 1, wherein the continuous strength layer has a thickness of 0.3 mm.

* * * * *